US010013440B1

(12) United States Patent
Gupta et al.

(10) Patent No.: US 10,013,440 B1
(45) Date of Patent: Jul. 3, 2018

(54) INCREMENTAL OUT-OF-PLACE UPDATES FOR INDEX STRUCTURES

(71) Applicant: Amazon Technologies, Inc., Reno, NV (US)

(72) Inventors: Anurag Windlass Gupta, Atherton, CA (US); Jakub Kulesza, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 818 days.

(21) Appl. No.: 14/530,483

(22) Filed: Oct. 31, 2014

(51) Int. Cl.
*G06F 17/30* (2006.01)

(52) U.S. Cl.
CPC .. *G06F 17/30312* (2013.01); *G06F 17/30067* (2013.01); *G06F 17/30327* (2013.01)

(58) Field of Classification Search
CPC ......... G06F 17/30312; G06F 17/30327; G06F 17/30067
See application file for complete search history.

(56) References Cited

U.S. PATENT DOCUMENTS

| 5,764,877 | A  | * | 6/1998  | Lomet  | G06F 11/1451 |
|-----------|----|---|---------|--------|--------------|
|           |    |   |         |        | 707/999.003  |
| 7,627,613 | B1 | * | 12/2009 | Dulitz | G06F 17/30864|
| 8,510,270 | B2 | * | 8/2013  | Pareek | G06F 17/30575|
|           |    |   |         |        | 707/635      |
| 8,996,797 | B1 | * | 3/2015  | Zheng  | G06F 17/30327|
|           |    |   |         |        | 711/103      |
| 9,195,727 | B2 | * | 11/2015 | Graefe | G06F 11/1451 |
| 9,218,383 | B2 | * | 12/2015 | Tan    | G06F 17/30345|
| 9,218,385 | B2 | * | 12/2015 | Tan    | G06F 17/30345|
| 9,400,816 | B1 | * | 7/2016  | Gubarev| G06F 17/30321|
| 9,430,274 | B2 | * | 8/2016  | Zhang  | G06F 17/30008|
| 9,665,605 | B2 | * | 5/2017  | Kogan  | G06F 17/30312|
| 9,684,570 | B1 | * | 6/2017  | Wilding| G06F 11/1471 |

(Continued)

OTHER PUBLICATIONS

Russell Sears et al., "bLSM: a general purpose log structured merge tree", May 20-24, 2012, SIGMOD '12 Proceedings of the 2012 ACM SIGMOD International Conference on Management of Data, Whole document.*

(Continued)

*Primary Examiner* — Rehana Perveen
*Assistant Examiner* — Alp Onat
(74) *Attorney, Agent, or Firm* — Robert C. Kowert; Meyertons, Hood, Kivlin, Kowert & Goetzel, P.C.

(57) ABSTRACT

Incremental, out-of-place updates may be implemented for index structures maintained for data stores. Portions of the index structure may be selected for updating, and an updated version of the portion of the index structure generated in another storage location different than a current storage location for the index structure such that the index structure may be searched in order to perform access requests. Updating the portion of the index structure may include compacting the portion of the index structure and/or merging the portion of the index structure with a sub-index structure generated from a portion of a log of index updates that may be maintained. The current portion of the index structure may then be replaced with the updated version of the current portion so that the updated version may be evaluated when searches of the index structure are performed.

20 Claims, 7 Drawing Sheets

(56) References Cited

U.S. PATENT DOCUMENTS

| | | | |
|---|---|---|---|
| 2008/0059414 A1* | 3/2008 | Cristofor | G06F 17/30312 |
| 2012/0030172 A1* | 2/2012 | Pareek | G06F 17/30575 |
| | | | 707/635 |
| 2013/0226959 A1* | 8/2013 | Dittrich | G06F 17/30442 |
| | | | 707/769 |
| 2013/0318044 A1* | 11/2013 | Pareek | G06F 17/30575 |
| | | | 707/635 |
| 2013/0332465 A1* | 12/2013 | Sasaki | G06F 17/30327 |
| | | | 707/741 |
| 2014/0188870 A1* | 7/2014 | Borthakur | G06F 17/30312 |
| | | | 707/736 |
| 2014/0195492 A1* | 7/2014 | Wilding | G06F 17/30371 |
| | | | 707/684 |
| 2014/0214767 A1* | 7/2014 | Graefe | G06F 11/1451 |
| | | | 707/645 |
| 2014/0279855 A1* | 9/2014 | Tan | G06F 17/30345 |
| | | | 707/609 |
| 2014/0279881 A1* | 9/2014 | Tan | G06F 17/30345 |
| | | | 707/613 |
| 2015/0186453 A1* | 7/2015 | Agarwal | G06F 17/30336 |
| | | | 707/781 |
| 2015/0278270 A1* | 10/2015 | Zhang | G06F 17/30008 |
| | | | 707/696 |
| 2015/0278281 A1* | 10/2015 | Zhang | G06F 17/30008 |
| | | | 707/703 |
| 2016/0188649 A1* | 6/2016 | Tan | G06F 17/30345 |
| | | | 707/609 |
| 2016/0188690 A1* | 6/2016 | Tan | G06F 17/30345 |
| | | | 707/613 |

OTHER PUBLICATIONS

Wei Tan et al., "Diff-index: Differentiated index in distributed log-structured data stores", 2014, 17th International Conference on Extending Database Technology, EDBT 2014—Athens, Greece, Whole document.*

Amur, Hrishikesh et al., "Design of a Write-Optimized Data Store", 2013, Georgia Institute of Technology, Whole document.*

Fay Chang, et al., "Bigtable: A Distributed Storage System for Structured Data", ACM Transactions on Computer Systems (TOCS) TOCS Homepage archive vol. 26 Issue 2, Jun. 2008, Article No. 4, pp. 1-14.

Patrick O'Neil, et al., "The Log-Structured Merge-Tree (LSM-Tree)", ACM Transactions on Computer Systems (TOCS) TOCS Homepage archive vol. 26 Issue 2, Jun. 2008, Article No. 4, pp. 1-32.

* cited by examiner

INCREMENTAL OUT-OF-PLACE UPDATES FOR INDEX STRUCTURES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data storage and data management.

Figure 1:
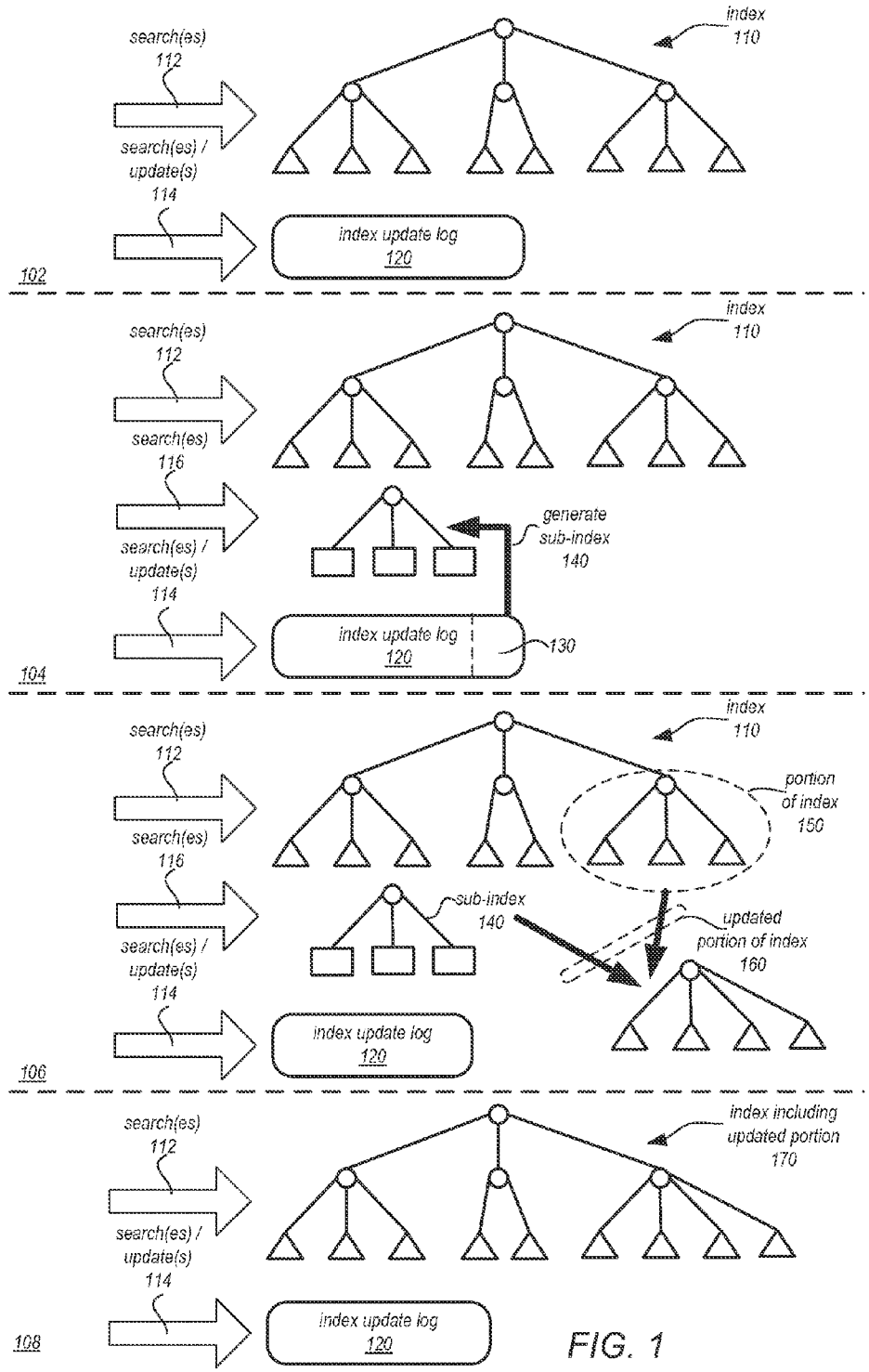
FIG. 1 illustrates a series of block diagrams implementing incremental out-of-place updates to index structures, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of incremental out-of-place updates for index structures are described herein. Managing data stored in data stores increases in complexity and operational cost as the amount of data stored in the data store increases. In order to provide more efficient access to data maintained in a data store for various workloads, such as analytics workloads, the indexing techniques may be implemented to organize the data, or instructing where certain data is located within underlying storage. B-trees, for instance, are a commonly implemented indexing technique for data stored in a relational database that organize data to identify storage locations for specific query predicates. For example, a query predicate may be evaluated by walking/scanning the B-tree index to identify storage locations that may include data values that satisfy a query.

Over time updates or changes to the data in the data store trigger updates or changes to the index structure for the data in the data store. Traditional index maintenance techniques often block searches when performing index updates, or have to generate an entire new version of the index before making the performance benefits of an updated version of the index available for search requests. In various embodiments, incremental out-of-place updates may update an index structure for a data store in piecewise fashion, allowing searches on the index structure to continue, while providing the updated portions of the index structure (increasing the efficiency of searches) incrementally (without waiting for the entire index structure to be updated).

FIG. 1 illustrates a series of block diagrams implementing incremental out-of-place updates to index structures, according to some embodiments. As illustrated in scene 102, an index 110 may be maintained for a data maintained in a data store. Index 110 may be maintained according to an index schema for the data store. For instance, in at least some embodiments, index 110 may be maintained as a b-tree type of index. Updates to the index generated as a result of access requests for the data store may be stored in a log of index updates 120. Thus, access requests may be quickly processed without performing an in-place update at index 110 in order to complete the access request. Therefore, in response to access requests that rely upon searches of index structure 110, searches may be performed 112 upon index structure 110 and performed 114 upon log of index updates 120.

The number of updates to index structure 110 stored in log of index updates 120 may continue to grow as more access requests are processed for the data store, in various embodiments. Thus, as illustrated in scene 104, a sub-index may be generated 140 from a portion 130 of log of index updates 120. For example, all of the log records in a certain time period may be included in the sub-index structure 140. The sub-index structure may be generated according to the same indexing schema as index structure 110. Subsequent access requests that rely upon searches may also then search 116 the sub-index 140, in some embodiments. Such searches may be more efficient than searching the log of index updates 120. In some embodiments, multiple sub-indexes may be generated for different portions of log of index updates 120.

As illustrated in scene 106, the generated sub-index 140 may be merged with a portion of index 150, in order to generate an updated portion of index 160. The updated portion may be stored in a different storage location than the sub-index 140 and the index structure 110 so that searches may still be performed upon the index structure 110 and the sub-index structure 140, as indicated by searches 112 and 116. As illustrated in scene 108, the updated portion of the index 160 may replace portion 150, to incremental update the index 170. Subsequent searches 112 may then evaluate the updated portion of the index 170. As sub-index 140 and updated portion of index 160 may be generated and stored out-of-place, in different storage locations, searches 112 may be continually processed during the operations and techniques illustrated in scenes 102 through 108.

A similar incremental approach may be performed with respect to compacting different portions of index structure 110, in some embodiments. For instance, a portion of index structure 110 may be selected, and an updated version that is more compact generated in a different storage location (so that searches may continue). The updated version of the portion may then replace the selected portion in order to compact the portion of the index structure 110 incrementally.

Please note that the previous description of an index structure, log of index updates, as well as generating sub-index structures and merging sub-index structures with the index structure for a data store, are logical illustrations and thus are not to be construed as limiting.

This specification begins with a general description of a data store that implements incremental out-of-place updates for index structures. Then various examples of a data store, including different components/modules, or arrangements of components/module that may be employed as part of implementing the data store are discussed. A number of different methods and techniques to implement incremental out-of-place updates for index structures are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
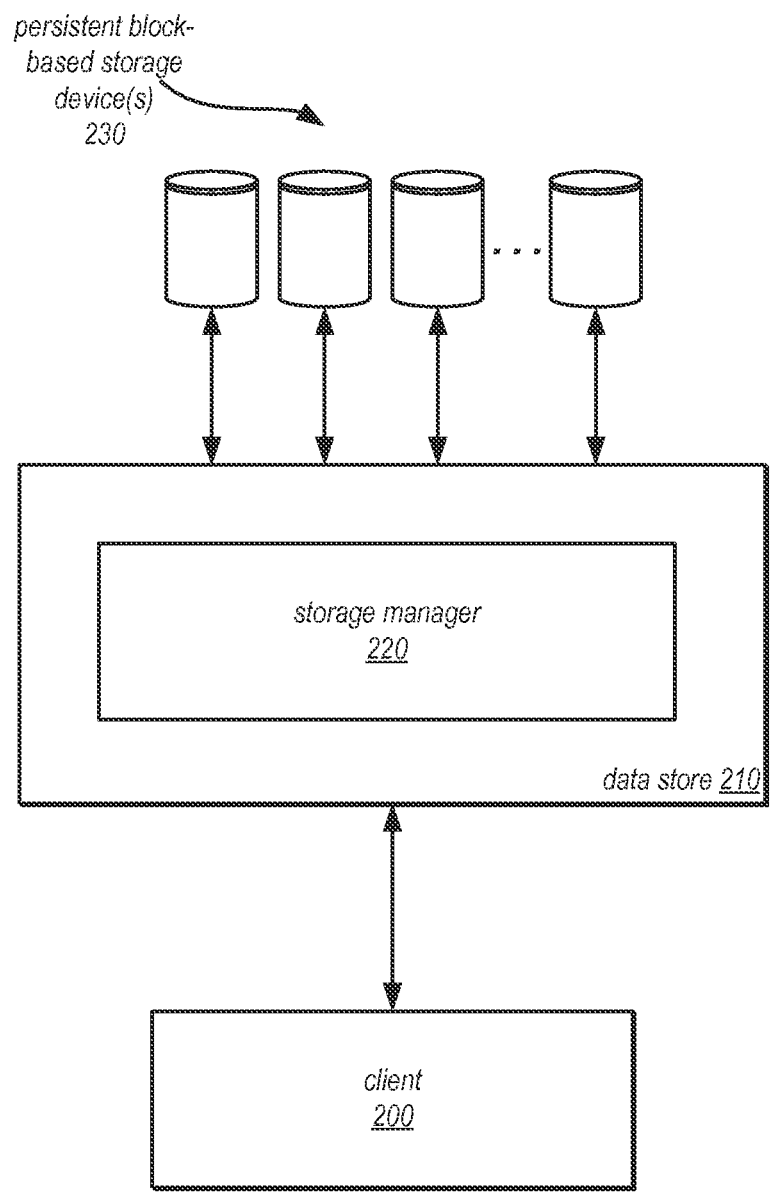
FIG. 2 is a block diagram illustrating an example storage system that implements incremental out-of-place updates to index structures, according to some embodiments.

FIG. 2 is a block diagram illustrating an example storage system that implements incremental out-of-place updates to index structures, according to some embodiments. A data store 210 may maintain data for a client 200 in one or multiple persistent block-based storage devices 230, in some embodiments. Data store 210 may maintain an index structure to provide efficient processing of access requests from client 200 for data in block-based storage devices 230. Data stores may be implemented as part of various different applications, such as a database, or as part of an operating system, such as a file system. In at least some embodiments, data store 210 may implement storage manager 220 to handle access requests to data (e.g., reads, writes, create, delete, or any other update or modification). Storage manager 220 may implement the various methods and techniques described below with FIGS. 3-6 to perform incremental, out-of-place updates to the index structure for data maintained for the client. In some embodiments, multiple different index structures may be maintained for the same user data.

A client 200 may communicate with data store 200 via a desktop computer, laptop computer, tablet computer, personal digital assistant, mobile device, server, or any other computing system or other device, such as computer system 1000 described below with regard to FIG. 7, configured to send requests to the data store 210, and/or receive responses from the data store 210. In some embodiments, data store 210 may be implemented as part of a same system or device as client 200 (e.g., a local database or file system), or may be a remote storage system or storage service. Requests to a remote storage system, for example may be formatted as a message that includes parameters and/or data associated with a particular function or service offered by data store 210. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients of data store 210.

Client 200 may communicate with data store 210 using a variety of different communication methods, such as over Wide Area Network (WAN) (e.g., the Internet). Private networks, intranets, and other forms of communication networks may also facilitate communication between clients and data store. A client may assemble a message including a request and convey the message to a network endpoint (e.g., a Uniform Resource Locator (URL)) corresponding to the data store 210). For example, a client 200 may communicate via a desktop computer running a local software application, such as a web-client, that is configured to send hypertext transfer protocol (HTTP) requests to data store 210. Responses or other data sent to clients may be formatted in similar ways. Internal communication pathways (such as illustrated below between a processor 1010 and persistent storage 1060 via I/O interface 1030) may also be implemented to communicate between a client 200, a data store 210, and storage devices 230.

Persistent block-based storage devices 230 may be hard-disk drives, or other persistent storage devices, such as solid state drives, as illustrated in FIG. 2, may be may be implemented as one or more of any type of storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof.

Figure 3:
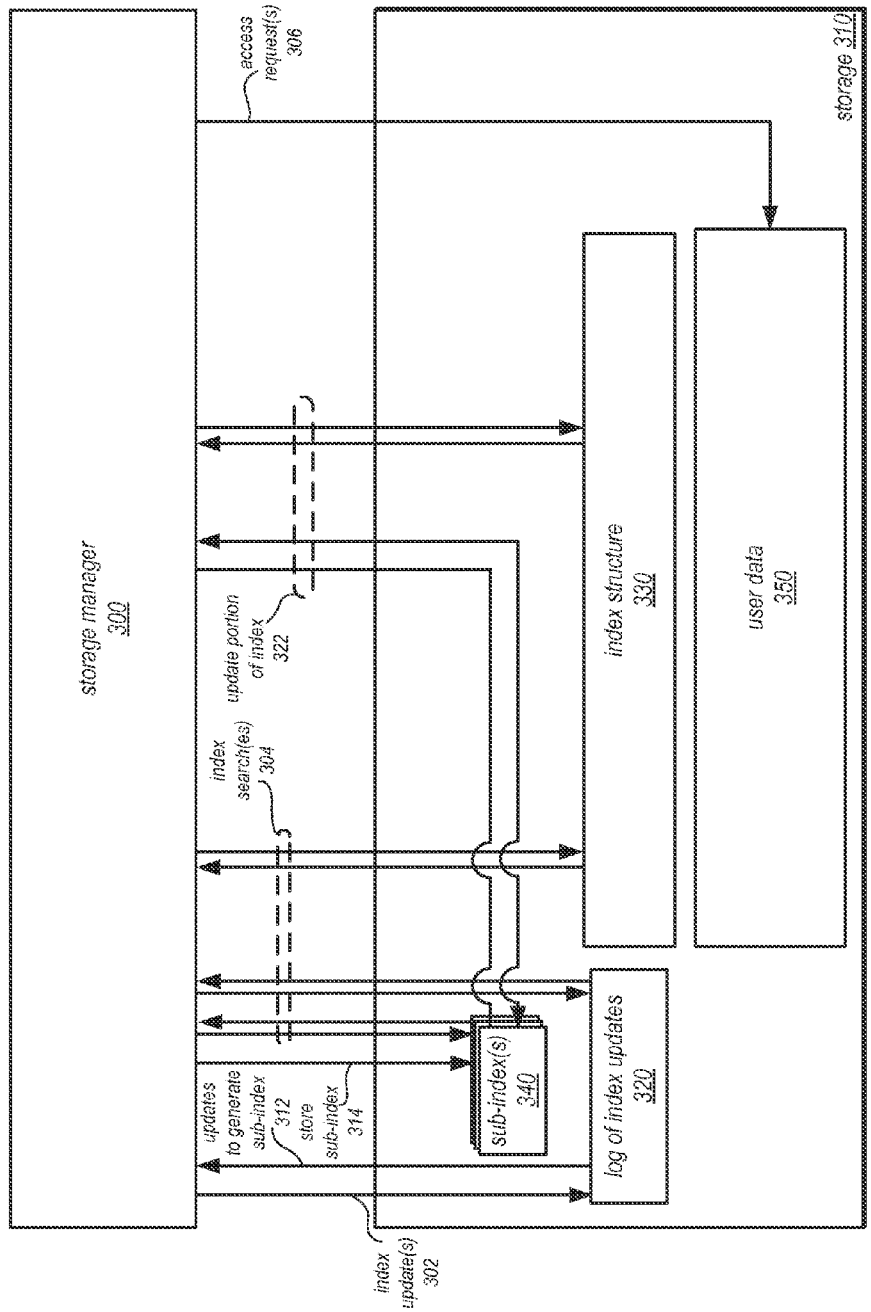
FIG. 3 is a block diagram illustrating an example storage manager that interacts with data storage to perform incremental out-of-place updates to index structures, according to some embodiments.

FIG. 3 is a block diagram illustrating an example storage manager that interacts with data storage to perform incremental out-of-place updates to index structures, according to some embodiments. Various different hardware and software devices may be used singly or in combination to implement storage manager 300. Storage manager 300 may be implemented as part of a storage system, such as data store 210 described above with regard to FIG. 2, or different type of storage system.

Storage manager may 300 may be configured, in various embodiments, to perform searches in response to different access requests received for the data store. For example, if a request for select data, such as a particular file or query for particular records in a database is received, searches 304 may be performed on index structure 330, log of index updates 320, and sub-index(s) 340. In some embodiments, storage manager 300 may be configured to maintain search rules or mapping information which indicates which index structures to search (which may also be updated when new index structures are added).

Storage manager 300 may also be configured to store updates 302 to log of index updates 320 in storage 310. For example, as access requests 306 change or modify user data 350 in storage 310, respective changes may be made to the index for the user data 350. Storage manager 300 may perform incremental updates to index structure 330, as discussed above with regard to FIG. 1 and according to the various techniques described below with regard to FIGS. 4-6. For example, storage manager may update index structure 330 by compacting portions of index structure 330 out-of-place, and then replacing the portions with the updated versions that are compacted. Such updates may be performed incrementally, and need not all be completed at any one time. Storage manager 300 may also get updates 312 from a portion of log of index updates 320 to generate and store a new sub-index 314 in a portion of storage for one or more sub-index(s) 340. Storage manager 300 may generate multiple sub-index structures, in some embodiments. Storage manager 300 may also access the sub-index(s) 340 and index structure 330 to update a current portion of the index structure 330 by merging a sub-index structure 340 out-of-place, and then replacing the updated version 322 in the index structure 330. Storage manager 300 may also monitor the search efficiencies of the various structures, such as log of index updates 320, index structure 330, and sub-index structures 340, to determine when to generate sub-index structures and merge sub-index structures.

While FIGS. 2 and 3 have been described and illustrated in the context of a storage manager for a data store, the various components illustrated and described in FIGS. 2 and 3 may be easily applied to other data management systems that provide data management and/or storage services, which may include various other data formats, or indexing schemas. As such, FIGS. 2 and 3 are not intended to be limiting embodiments in a storage system that implements incremental out-of-place updates to index structures. Moreover, the storage manager and storage system are provided as an example of a data store which may implement incremental out-of-place updates to index structures, which may also be implemented for a variety of other different data stores.

Figure 4:
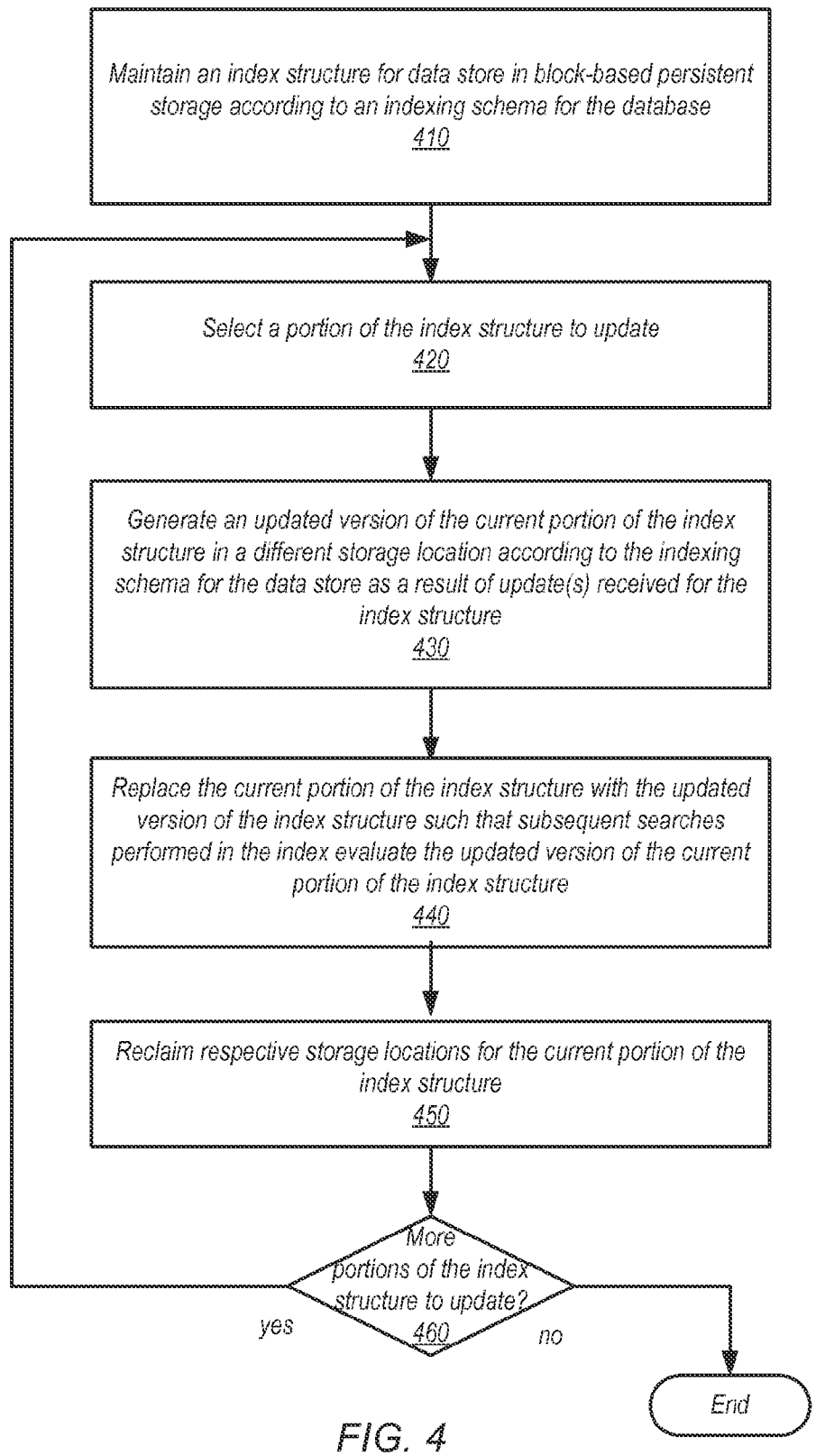
FIG. 4 is a high-level flowchart illustrating various methods and techniques to implement incremental out-of-place updates for an index structure, according to some embodiments.

FIG. 4 is a high-level flowchart illustrating various methods and techniques to implement incremental out-of-place updates for an index structure, according to some embodiments. Various different systems and devices may implement the various methods and techniques described below, either singly or working together. For example, a storage manager, such as storage manager 220 or 330 described above with regard to FIGS. 2 and 3, and/or a query engine may be configured to implement the various methods. For instance, a query engine may search the index structures, log of index updates and/or sub-index structures and store index updates in the log of index updates, whereas the storage manager may incrementally update the index structure, such as by generating and merging sub-index structures or performing compaction. Alternatively, a combination of different systems and devices, such as the multiple types of compute nodes described below with regard to FIG. 7 working together in distributed fashion, for example, may also perform the below methods and techniques. Therefore, the above examples and or any other systems or devices referenced as performing the illustrated method, are not intended to be limiting as to other different components, modules, systems, or configurations of systems and devices.

As indicated at 410, an index structure may be maintained for a data store in block-based persistent storage according to an indexing schema for the data store, in various embodiments. The index structure may be one of many different types of index structures, such as the many different types of tree index structures, such as height-balanced search binary search trees or b-trees, hash indices, or any other type of indices.

As indicated at 420, a current portion of the index structure may be selected for an update, in various embodiments. The portion of the index structure may be selected according to the way in which the updated version of the current portion may be updated. For example, if the current portion is to be updated by performing a compaction technique, then the current portion of the index to be selected based upon an ordering for compacting the index structure. If, the update is to be performed by merging the index structure with a sub-index structure, as discussed below with regard to FIG. 5, then the portion of the index structure compatible with the sub-index structure may be identified.

In various embodiments, an updated version of the current portion of the index structure may be generated in a different storage location according to the indexing schema as a result of updates received for the data store, as indicated at 430. As noted above, in some embodiments, the updated version of the current portion of the index structure may be generated by performing compaction of the portion of the index. Compaction may remove obsolete entries, nodes, or other information stored in the current portion of the index structure and regenerate the portion of the index structure according to the indexing schema without the removed information. For example, compaction of a tree index structure may re-balance, rotate, merge, and/or split nodes in order to generate a denser tree structure. As a result of applying a compaction technique, in some embodiments, the size (e.g., amount of storage space required to maintain the portion) of the updated version of the index structure after compaction may be less than the size of the current portion of the index structure prior to compaction. In at least some embodiments, generating an updated version of the current portion of the index structure may be performed by merging a sub-index structure with the current portion, as described below with regard to FIG. 5. By generating the updated version of the current portion of the index structure in a different storage location than the storage location of the current portion, searches may still be performed on the index structure.

The current portion of the index structure may be replaced with the updated version of the current portion so that subsequent searches performed in the index structure evaluate the updated version of the current portion of the index structure, as indicated at 440, in various embodiments. For example, mapping information or links that indicate the location of the current portion of the index structure may be replaced or updated to point to the storage location(s) of the updated version of the current portion. In at least some embodiments, locks or some other concurrency mechanism may block changes to the mapping information or links (e.g., pointers in parent or child nodes) while the current portion is replaced with the updated version of the current portion.

In at least some embodiments, respective storage locations for the current portion of the index may be reclaimed for storing other data, as indicated at 450. If other portions of the index structure are to be updated, as indicated by the positive exit from 460, then the elements of 420 through 450 may be repeated. If not, as indicated by the negative exit form 460, then incremental updates to the index structure may be complete.

Figure 5:
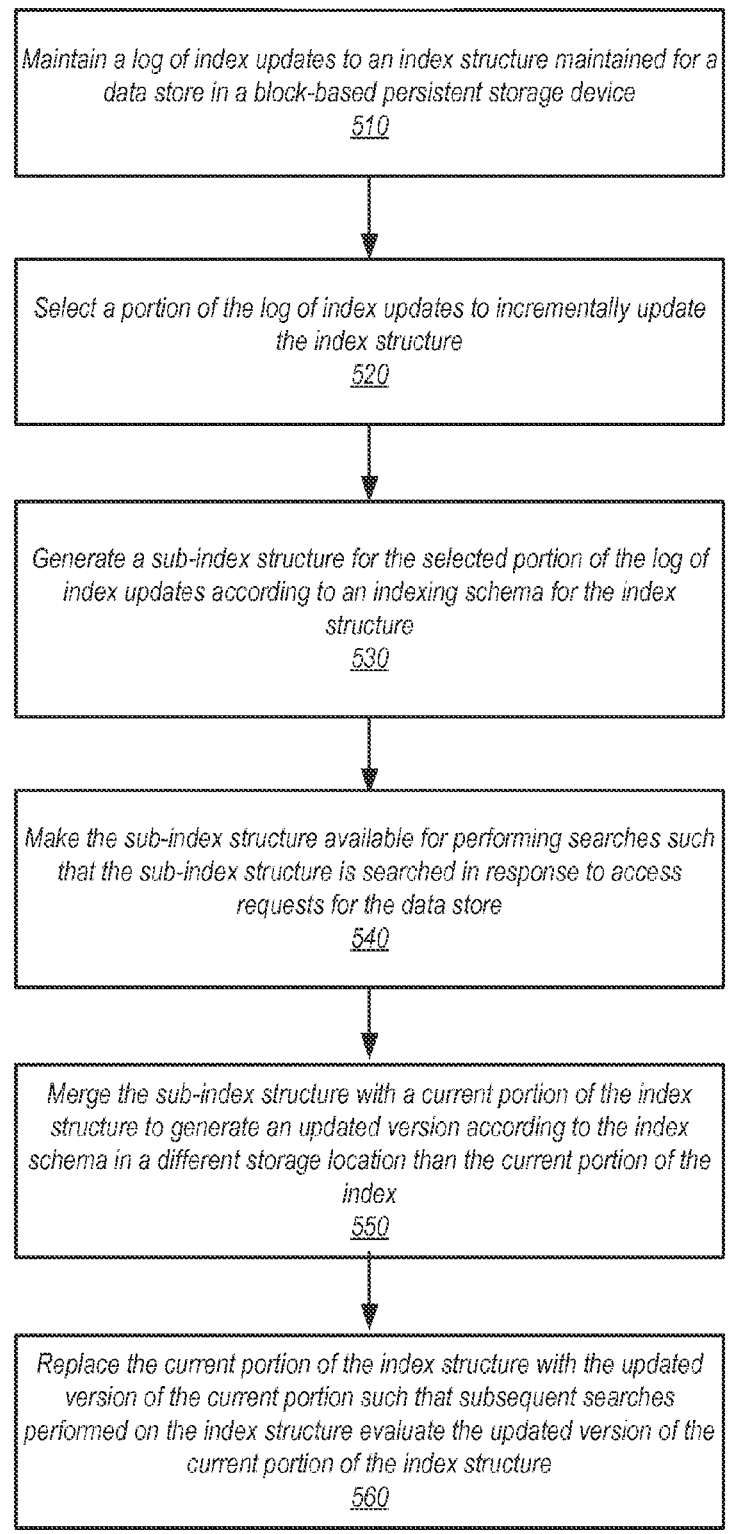
FIG. 5 is a high-level flowchart of methods and techniques to implement incremental out-of-place updates for an index structure merging a sub-index generated from a log of index updates with the index structure, according to some embodiments.

As noted above, some updates to portions of an index structure may be performed by merging a portion of the index structure with another sub-index structure. For example, as updates to an index structure are received, the updates may be organized as a new index structure, which may later be merged as a sub-index structure with the index structure. FIG. 5 is a high-level flowchart of methods and techniques to implement incremental out-of-place updates for an index structure merging a sub-index generated from a log of index updates with the index structure, according to some embodiments.

As indicated at 510, a log of index updates may be maintained for an index structure in a persistent block-based data store, in various embodiments. For example, various log records, journal entries or other information may be stored to indicate the changes made to the index structure as a result of various updates to the data store. For example, insertions of new data, deletions of data, modifications of data, or any other changes that may affect the index structure may be received and logged in the log of index updates. In at least some embodiments, the log of index updates may be stored according to the order in which the updates are received. However, the log of index updates may not be stored according to a same indexing schema as enforced for the index structure (e.g., may not be organized in an ordering similar to a b-tree or other indexing schema enforced for the index structure).

As indicated at 520, a portion of the log of index updates may be selected to incrementally update the index structure, in various embodiments. The portion of the log selected may be a certain group of log records associated with a certain range of time, in some embodiments. For instance, log records with time stamps from 10:00:00 to 10:59:59 may be selected as the portion of the log to incrementally update in the index structure. In at least some embodiments, a portion of log records may be selected (as well as the sub-index structure generated) in response to determining that that a search efficiency metric for the log of index updates is below an efficiency threshold. For example, a search efficiency metric may simply be based on a length or number of updates in the log. As the number of updates in the log increases, the search efficiency metric may fall (e.g., as there are more updates to evaluate when searching the log in response to an access request). The search efficiency metric may, in some embodiments, be based on average search times or other information collected in regard to the performance of searches (either for the log specifically or over all structures to search, such as the index structure and any previously generated sub-index structures that have not been merged with the index structure).

As indicated at 530, a sub-index structure may be generated from the portion of the log of index updates according to a same indexing schema as implemented for the index structure, in various embodiments. For instance, if the index structure is maintained according to a b-tree indexing schema, then the sub-index may also be generated as a b-tree for the updates included in the portion of the log of updates that is selected. In at least some embodiments, the sub-index structure may be stored persistent block-based storage. Storage space for the updates in the log of index updates may be reclaimed, in some embodiments, after the sub-index structure is generated.

As indicated at 540, the sub-index structure may be made available for performing searches such that the index structure, the log of index updates, and the sub-index structure are searched in response to access requests for the data store, in various embodiments. For example, a query engine, or other component of a storage manager or data store may be notified of the creation of a new indexing structure search in addition to the index structure and the log of index updates. In at least some embodiments, elements 520 through 540 may be repeated multiple times, generating multiple different sub-index structures for different portions of the log of index updates. As more index updates are received, for instance, the number of sub-index structures created may grow until such a time that one or more of the sub-index structures are merged with the index structure, as discussed below with regard to element 550. In this way, updates to the index may be efficiently recorded, reducing latency for performing updates to the data store.

As indicated at 550, the sub-index structure may be merged with a current portion of the index structure to generate an updated version of the current portion of the index structure, in various embodiments. The current portion of the index structure may, in some embodiments, be identified based on the content of the sub-index structure to be merged. For example, if the updates described in the sub-index b-tree structure are related to portion of data described the data store in certain nodes of the b-tree index structure, then those nodes of the b-tree index structure may be selected for update. Merging the sub-index structure with the index structure may be performed at various times. For example, the sub-index structure may be merged in response to detecting that a foreground processing activity level is below a foreground processing threshold such that merging the sub-index structure with the index structure does not affect the performance of foreground processing (e.g., processing updates/reads of the data store). In some embodiments, the sub-index structure may be merged when it a search efficiency metric for searches performed overall (e.g., on the log of index updates, the index structure, and the sub-index structure—as well as any other sub-index structures).

Merging the sub-index structure may be performed in such a way as to preserve the updates of the sub-index structure in the index structure. For example, various techniques for merging tree structures, such as b-trees, may be performed (e.g., rotations, splitting nodes, merging nodes, etc. . . . ). The updated version may be stored in one or more storage locations that are different than storage locations storing the current portion of the index structure in the persistent block-based storage device(s). Thus, while the merge between the sub-index structure and the current portion of the index structure is performed, searches may still be performed on the index structure and the sub-index structure.

As indicated at 560, the current portion of the index may be replaced with the updated version of the current portion such that subsequent searches performed on the index structure evaluate the updated version of the index structure, in various embodiments. For example, mapping information or links that indicate the location of the current portion of the index structure may be replaced or updated to point to the storage location(s) of the updated version of the current portion. In at least some embodiments, locks or some other concurrency mechanism may block changes to the mapping information or links (e.g., pointers in parent or child nodes) while the current portion is replaced with the updated version of the current portion.

The techniques discussed above with regard to FIG. 5 may be performed repeatedly. As more sub-index structures are generated as more updates to the index structure are received, then these sub-index structures may be eventually merged with index structure, updating the index structure in piecewise fashion.

Figure 6:
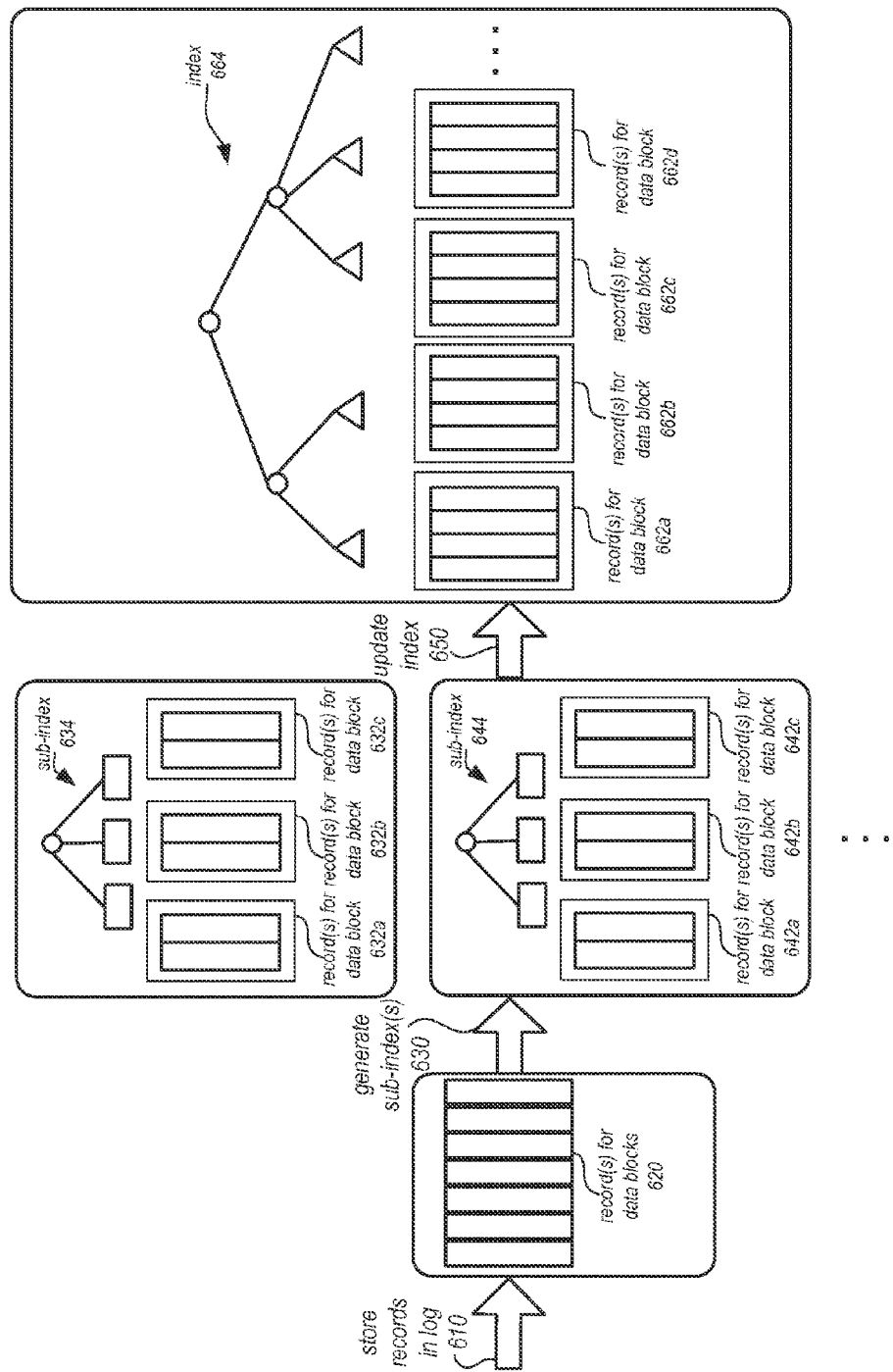
FIG. 6 is a logical block-diagram illustrating incremental out-of-place updates for an index structure implemented for a log-structured data store, according to some embodiments.

Various different types of data stores may implement incremental out-of-place updates for index structures. As noted above with regard to FIG. 2, various different databases or file systems may, for instance, utilize index structures such as b-trees, and thus may implement incremental out of place updates. FIG. 6 is a logical block-diagram illustrating incremental out-of-place updates for an index structure implemented for a log-structured data store, according to some embodiments.

As updates are made to the log structured data store, log records 620 for the updates may be stored 610 together in the log for the log structured data store. In some embodiments, the log records may be stored in the order in which they are received (and if traveling over a network or other form of transport prone to data loss the log records may arrive out of an original ordering, such as log sequence numbers (LSNs). The log records themselves may indicate updates to individual data blocks or data pages in persistent block-based storage, in some embodiments.

In at least some embodiments, an index 664 may be maintained for discovering the log records. A b-tree or other index may, in some embodiments, be implemented to co-locate those log records making changes to the same data block or data page together in the index. For instance, as illustrated in FIG. 6, different respective nodes of index 664 may correspond to the log records for a particular data block, such as records for data blocks 662a, 662b, 662c, and 662d. Maintaining an index, such as index 664, may allow access requests for particular versions of a data block or page to quickly identify the log records necessary to generate the particular version of the data block by searching the index.

Incremental updates to index 664 may be performed, in some embodiments. For instance, as the number log records 620 in the log grow, sub-index(s) may be generated 630. The sub-index(s), such as sub-index structures 634 and 644, may describe a set of log records describing changes to particular data block within a period of time. Records for data block 632a may describe changes to a data block during the course of one particular hour, while changes that occurred to the same data block in a different hour may described in a different sub-index structure, such as the log records 642a. Thus, the different sub-index structures may correspond to different generations or versions of a data block over time. Eventually, the sub-index structures may be merged with index 664 in order to update 650 the index.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of incremental, out-of-place updates for index structures as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 7:
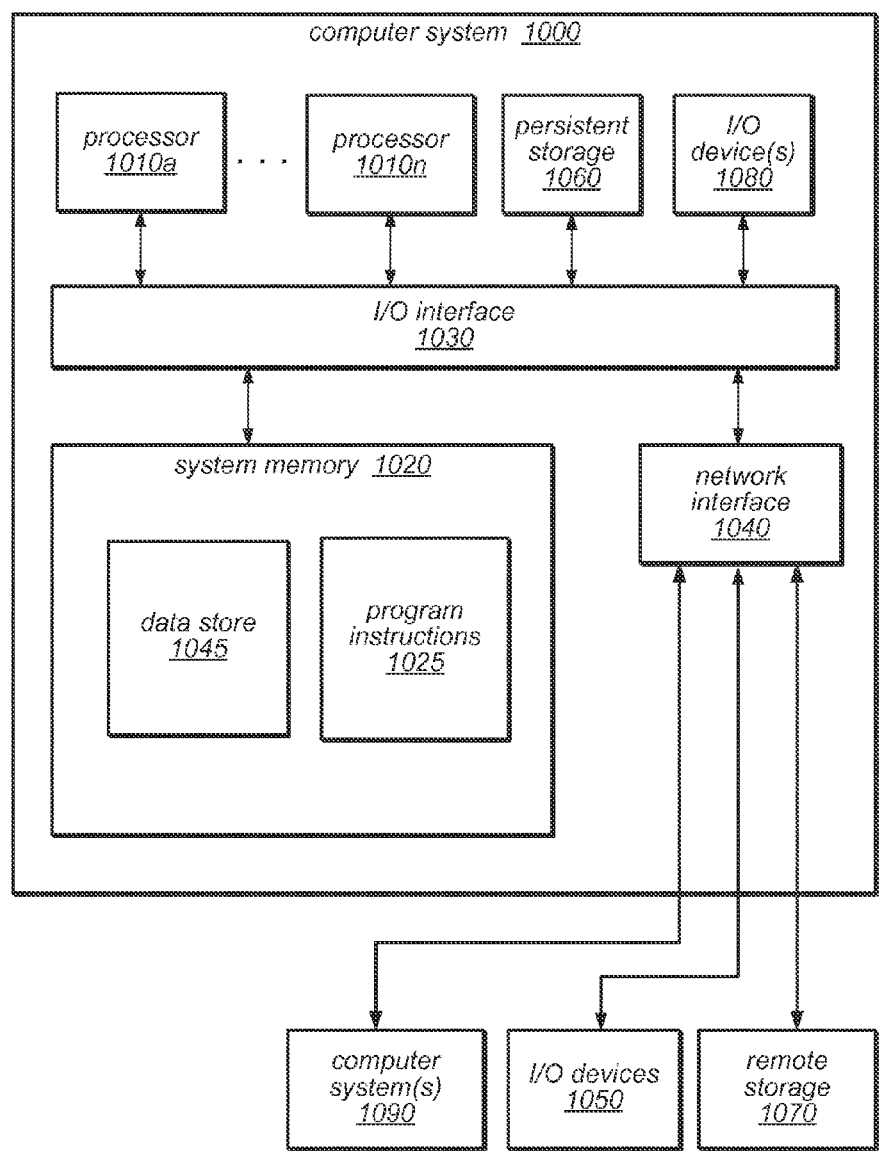
FIG. 7 illustrates an example system configured to implement the various methods, techniques, and systems described herein, according to some embodiments.

As shown in FIG. 7, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the figures. Data storage 1035 may include data that may be used in embodiments. In other embodiments, other or different software elements and data may be included.

Those skilled in the art will appreciate that computer system 1000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more network-based services. For example, storage nodes within a data storage service and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more block-based persistent storage devices, configured to maintain an index structure for a data store and a log of index updates to the index structure, wherein the index structure is maintained according to an indexing schema for the data store, wherein the log of index updates is not maintained according to the indexing schema, wherein the index structure and the log of index updates are searched in response to access requests received for the data store;
   at least one processor;
   a memory, comprising program instructions that when executed cause the at least one processor to execute a storage manager to:
      select a portion of the log of index updates to incrementally update the index structure;
      generate a sub-index structure for the selected portion of the log of index updates according to the indexing schema;
      in response to the generation of the sub-index structure, make the sub-index structure available for performing searches such that the sub-index structure is searched in response to access requests received for the data store;
      merge the sub-index structure with a current portion of the index structure to generate an updated version of the current portion of the index structure according to the index schema, wherein the updated version of the current portion of the index structure is generated in a different one or more storage locations at the one or more block-based persistent storage devices than a respective one or more storage locations of the current portion of the index structure at the one or more block-based persistent storage devices; and
      replace the current portion of the index structure with the updated version of the index structure such that subsequent searches performed on the index structure evaluate the updated version of the current portion of the index structure and the log of index updates.

2. The system of claim 1, wherein the selection, the generation, and the sub-index structure made available are performed for multiple other portions of the log of index updates prior to the merge of the sub-index structure for the portion of the log of index updates with the current portion of the index structure, wherein sub-index structures generated for the other portions of the log of index updates are searched in response to access requests received for the data store.

3. The system of claim 1, wherein the selection of the portion of log of index updates and the generation of the sub-index structure are performed in response to a determination that a search efficiency metric for the log of index updates is below and efficiency threshold.

4. The system of claim 1, wherein the index schema for the index structure is a b-tree index schema, wherein the index structure is implemented as part of a database maintained at the data store, and wherein searches of the index structure are performed in response to receiving queries for select data of the database.

5. A method, comprising:
   performing, by one or more computing devices:
      storing an index structure for a data store in at least one block-based persistent storage device according to an indexing schema for the data store;

storing a log of index updates to the index structure, wherein the log of index updates is not maintained according to the indexing schema, and wherein the index structure and the log of index updates are searched in response to access requests received for the data store;

incrementally updating the index structure, wherein the index structure is available for searches during the updating, and wherein updating the index structure comprises:

selecting a current portion of the index structure to update;

generating an updated version of the current portion of the index structure as a result of one or more updates received for the data store according to the indexing schema for the data store, wherein the updated version of the current portion of the index structure is generated in a different one or more storage locations than a respective one or more storage locations maintaining the current portion of the index structure; and replacing the current portion of the index structure with the updated version of the index structure such that subsequent searches performed on the index structure evaluate the updated version of the current portion of the index structure and the log of index updates.

6. The method of claim 5, wherein generating the updated version of the current portion of the index structure comprises compacting the current portion of the index structure, wherein a size of the updated version of the current portion of the index structure is less than a size of the current portion of the index structure prior to compacting the current portion of the index structure.

7. The method of claim 6, wherein incrementally updating the index structure is performed in response to determining that a search efficiency metric for the index structure is below an efficiency threshold.

8. The method of claim 5, wherein generating the updated version of the current portion of the index structure comprises merging the current portion of the index structure with a sub-index structure generated from a plurality of updates received for the index structure.

9. The method of claim 8,
wherein a log of index updates is persistently maintained, wherein a portion of the log of index updates comprises the plurality of updates received for the index structure, wherein the log of index updates is searched in response to access requests received for the data store in addition to the index structure;
wherein the method further comprises generating the sub-index structure according to the indexing schema from the portion of the log of index updates, wherein the sub-index structure is searched in response to access requests received for the data store in addition to the index structure until merged with the current portion of the index structure.

10. The method of claim 9, wherein a plurality of other sub-index structures are generated from different portions of the log of index updates prior to merging the sub-index structure for the portion of the log of index updates with the current portion of the index structure, wherein the plurality of other sub-index structures are searched in response to access requests received for the data store.

11. The method of claim 5, wherein the data store is a log-structured data store, wherein the indexing schema for the index structure co-locates one or more log records corresponding to respective data blocks in the log-structure data store such that a particular version of a particular data block of the respective data blocks is generated according to at least one log record found for the particular data block as a result of a search of the index structure.

12. The method of claim 5, wherein the index schema for the index structure is a b-tree index schema.

13. The method of claim 5, wherein the index structure is implemented as part of a database maintained at the data store, and wherein searches of the index structure are performed in response to receiving queries for select data of the database.

14. A non-transitory, computer-readable storage medium, storing program instructions that when executed by one or more computing devices cause the one or more computing devices to implement:

maintaining a log of index updates to an index structure maintained for a data store in at least one block-based persistent storage device, wherein the index structure is maintained according to an indexing schema for the data store, wherein the log of index updates is not maintained according to the indexing schema, wherein the index structure and the log of index updates are searched in response to access requests received for the data store;

selecting a portion of the log of index updates to incrementally update the index structure;

generating a sub-index structure for the selected portion of the log of index updates according to the indexing schema;

in response to generating the sub-index structure, making the sub-index structure available for performing searches such that the sub-index structure is searched in response to access requests received for the data store;

merging the sub-index structure with a current portion of the index structure to generate an updated version of the current portion of the index structure according to the index schema, wherein the updated version of the current portion of the index structure is generated in a different one or more storage locations than a respective one or more storage locations maintaining the current portion of the index structure; and replacing the current portion of the index structure with the updated version of the index structure such that subsequent searches performed on the index structure evaluate the updated version of the current portion of the index structure and the log of index updates.

15. The non-transitory, computer-readable storage medium of claim 14, wherein the selecting of the portion of log of index updates and the generating of the sub-index structure are performed in response to determining that a search efficiency metric for the log of index updates is below and efficiency threshold.

16. The non-transitory, computer-readable storage medium of claim 14, wherein the selecting, the generating, and the making are performed for multiple other portions of the log of index updates prior to merging the sub-index structure for the portion of the log of index updates with the current portion of the index structure, wherein sub-index structures generated for the other portions of the log of index updates are searched in response to access requests received for the data store.

17. The non-transitory, computer-readable storage medium of claim 14, wherein the index schema for the index structure is a b-tree index schema.

18. The non-transitory, computer-readable storage medium of claim 14, wherein the selecting, the generating, the making, the merging, and the replacing are automatically performed as part of background processing, and wherein processing access requests for the data store that perform searches is performed as part of foreground processing.

19. The non-transitory, computer-readable storage medium of claim 14, wherein the data store is a log-structured data store, wherein the indexing schema for the index structure co-locates one or more log records corresponding to respective data blocks in the log-structure data store such that a particular version of a particular data block of the respective data blocks is generated according to at least one log record found for the particular data block as a result of a search of the index structure, and wherein the sub-index structure co-locates at least one log record corresponding to one or more of the respective data blocks according to a range of time associated with the selected portion of the log of index updates.

20. The non-transitory, computer-readable storage medium of claim 14, wherein the index structure is implemented as part of a file system maintained at the data store, wherein searches of the index structure are performed in response to receiving access requests for select files of the file system.

* * * * *